Patented Mar. 2, 1937

2,072,238

UNITED STATES PATENT OFFICE 2,072,238

MANUFACTURE OF NAPHTHALENE DERIVATIVES

Max Wyler and Arnold Kershaw, Blackley, Manchester, England, assignors to Imperial Chemical Industries Limited, a corporation of Great Britain No Drawing. Application August 2, 1935, Serial No. 34,452. In Great Britain August 8, 1934

4 Claims. (Cl. 260—44)

This invention is directed to the preparation of new naphthalene derivatives; more particularly, to naphthoylene-aryl-imidazole-bis-carboxyalkylarylides of the following probable formula:

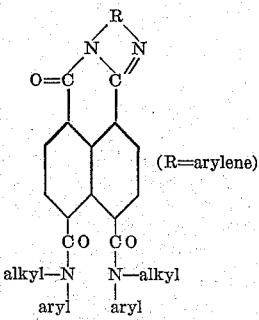

(R=arylene)

which are obtained by condensing 1,8-dicarboxynaphthalene-4,5-bis-carboxyalkylarylides or their anhydrides with o-arylene-diamines or their salts. This invention also contemplates the preparation of naphthoylene - a r y l - imidazole-dicarboxylic acids and the corresponding anhydrides by hydrolyzing the naphthoylene-aryl-imidazole-bis-carboxyalkylarylides above mentioned to remove the alkylarylide groups. These compounds may be obtained as the acids or anhydrides, depending upon the method used in their isolation.

These naphthalene derivatives are valuable dyestuff intermediates. The 1,8-dicarboxy-naphthalene - 4,5 - b i s - carboxy - methylanilide and -ethylanilides are the most convenient to use as starting materials in most cases, especially where the alkylarylide radical is to be removed, because these compounds are the most readily obtained. Other carboxyarylide groups, however, may be used, including those in which the alkyl group is a higher aliphatic chain and also in which the aryl radical may be naphthyl. The aryl radical may also carry simple substituents such as methyl or chlorine. These starting materials may be prepared by the process described in copending application Ser. No. 28,373, filed June 25, 1935. The condensation of the arylene-diamines may be carried out by merely heating the mixture, or it may be carried out in the presence of solvents or diluents. Hydrolysis may be effected by heating with aqueous sulfuric acid solution.

The new naphthalene derivatives are suitable intermediates for the manufacture of dyestuffs. The naphthoylene - aryl - imidazole - dicarboxylic acids and their anhyrides, although not broadly new as a class, are readily prepared by the process herein described. This process offers advantages in the preparation of the known carboxylic acid compounds over the processes described in British Patent 313,887 and German Patent 523,521.

The following examples in which parts are by weight illustrate but do not limit the invention.

Example 1

A suspension of 50 parts of o-phenylenediamine and 197 parts of the anhydride of 1,8-dicarboxy-naphthalene-4,5-bis-carboxyethylanilide in 800 parts of glacial acetic acid is boiled under reflux for 3 hours, the mixture is poured into 4000 parts of boiling water and the undissolved matter filtered off. On drying, this forms a dull yellow powder, which dissolves readily in cold benzene and cold glacial acetic acid, and sparingly in ethanol and in petroleum ether. It dissolves in concentrated sulfuric acid with a deep yellow color. By dissolving in o-dichlorobenzene and adding ethanol, it crystallizes in fine orange needles, M. P. 213–214° C. (Analysis, N found 9.7%, N calculated 9.9%). The yield is nearly quantitative.

Example 2

A mixture of 22 parts of the product of Example 1 and 200 parts of 60% sulfuric acid is boiled for a few minutes, poured into 1000 parts of water, the orange precipitate filtered, redissolved in dilute caustic soda, filtered and reprecipitated with acid and dried at 100° C. It is the anhydride. The yield is nearly quantitative.

Example 3

By replacing the 50 parts of o-phenylenediamine of Example 1 by 60 parts of 1,3,4-toluylenediamine and proceeding as described, the methyl homologue of the bis-carboxyethylanilide is obtained as an orange powder, soluble in concentrated sulfuric acid with an orange-red color. The solubility in organic solvents is similar to that of the lower homologue.

Example 4

The product of Example 3 is hydrolyzed in the same manner as described in Example 2. When precipitated from its yellow alkaline solution with acid the product is orange-yellow and on drying at 100° C. it becomes red. It neither melts nor decomposes at 360° C.

Example 5

By replacing the 50 parts of o-phenylenediamine of Example 1 by 70 parts of 4-chloro-1,2- phenylenediamine the corresponding chloro homologue bis-carboxyethylanilide compound is produced and crystallizes from the reaction mixture on cooling in small orange crystals. It dissolves in concentrated sulfuric acid with an orange-yellow color.

*Example 6*

The product of Example 5 is hydrolyzed in the above described manner. The almost colorless alkaline solution of the product gives with acid a yellow precipitate which becomes red at 100° C. and then remains unaltered at as high a temperature as 360° C.

*Example 7*

By replacing the 50 parts of o-phenylenediamine of Example 1 by 68 parts of 1,2-naphthylenediamine an orange-red bis-carboxyethyl-anilide product, soluble in concentrated sulfuric acid with a red color, is obtained.

*Example 8*

On hydrolyzing the product of Example 7 in the above described way, the product is obtained as a violet-brown powder, soluble in alkali with an orange color, from which acid precipitates it as a red solid, which becomes violet-brown at 100° C. Its solution in concentrated sulfuric acid is violet.

We claim:

1. The process for preparing naphthoylene-aryl-imidazole-bis-carboxyalkylarylides which comprises condensing a compound of the class consisting of 1,8-dicarboxy-naphthalene-4,5-bis-carboxyalkylarylides of the benzene and naphthalene series and their anhydrides with a compound of the class consisting of o-arylene-diamines of the benzene and naphthalene series and their salts.

2. The process for preparing naphthoylene-aryl-imidazole-bis-carboxyalkylarylides which comprises condensing a compound of the class consisting of 1,8-dicarboxy-naphthalene-4,5-bis-carboxyalkylarylides of the benzene and naphthalene series and their anhydrides with a compound of the class consisting of o-arylene-diamines of the benzene and naphthalene series and their salts, and hydrolyzing the resulting product to remove the alkylarylide groups.

3. Compounds of the following general formula:

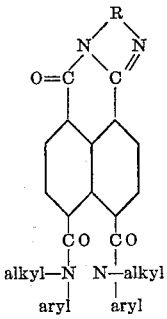

wherein R represents an arylene radical of the benzene and naphthalene series, and wherein the aryl radicals are of the benzene and naphthalene series.

4. Compounds of the following general formula:

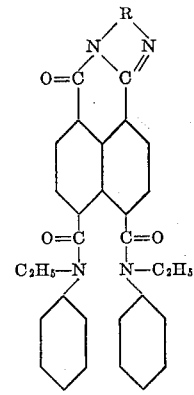

wherein R represents a radical of the benzene series.

MAX WYLER.
ARNOLD KERSHAW.